(12) United States Patent
Lee et al.

(10) Patent No.: US 8,454,912 B2
(45) Date of Patent: Jun. 4, 2013

(54) ADSORBENT, PREPARATION METHOD THEREOF AND SR-90/Y-90 GENERATOR USING THE SAME

(75) Inventors: Jun Sig Lee, Daejeon (KR); Hyon-Soo Han, Daejeon (KR); Ul-Jae Park, Daejeon (KR); Kyung-Duk Jang, Daejeon (KR); Hyeon-Young Shin, Daejeon (KR); Soon-Bog Hong, Daejeon (KR); Kwang-Jae Son, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 194 days.

(21) Appl. No.: 12/934,492

(22) PCT Filed: Mar. 27, 2009

(86) PCT No.: PCT/KR2009/001574
§ 371 (c)(1),
(2), (4) Date: Sep. 24, 2010

(87) PCT Pub. No.: WO2009/120038
PCT Pub. Date: Oct. 1, 2009

(65) Prior Publication Data
US 2011/0020206 A1    Jan. 27, 2011

(30) Foreign Application Priority Data
Mar. 27, 2008  (KR) .................. 10-2008-0028514

(51) Int. Cl.
| | | |
|---|---|---|
| C01F 13/00 | (2006.01) |
| C01F 15/00 | (2006.01) |
| C01F 17/00 | (2006.01) |
| C01F 1/00 | (2006.01) |
| C01F 5/00 | (2006.01) |
| C01F 11/00 | (2006.01) |
| C01G 43/00 | (2006.01) |
| C01G 56/00 | (2006.01) |
| C22B 26/20 | (2006.01) |
| B01J 20/22 | (2006.01) |
| B01J 20/00 | (2006.01) |
| B01D 15/00 | (2006.01) |
| C02F 1/42 | (2006.01) |
| B01D 59/44 | (2006.01) |

(52) U.S. Cl.
USPC ............. 423/2; 423/21.1; 423/155; 502/401; 502/407; 210/679; 210/682; 250/432 PD (58) Field of Classification Search
USPC ............. 502/400, 401, 407; 423/249, 2, 21.1, 423/155; 210/660, 679, 682; 250/432 R, 250/432 PD
See application file for complete search history.

(56) References Cited

U.S. PATENT DOCUMENTS
4,201,747 A    5/1980  Minagawa et al.
(Continued)

OTHER PUBLICATIONS

Fajardo, Y., et al. "Multisyringe flow injection analysis of stable and radioactive yttrium in water and biological samples," Analytica Chimica Acta 539, (2005) 189-194.

*Primary Examiner* — Anthony J Zimmer
(74) *Attorney, Agent, or Firm* — Lucas & Mercanti, LLP (57) ABSTRACT

Disclosed herein is an radioisotope adsorbent including a bifunctional organosilane compound, including an organosiloxane functional group and a phosphate group, bonded on the surface of silica which is a bone structure of the adsorbent, and a method of preparing the radioisotope adsorbent, and a strontium/yttrium generator using the radioisotope adsorbent. Since the radioisotope adsorbent has a high adsorption capacity for $^{90}Y$ such as 95% extraction efficiency or more from ICi $^{90}Sr/^{90}Y$ by using a column packed with 0.4 g of the adsorbent with a high-purity of $^{90}Y$, it can be usefully to be employed in the fields requiring $^{90}Y$.

11 Claims, 6 Drawing Sheets

U.S. PATENT DOCUMENTS

| | | |
|---|---|---|
| 4,788,176 A | 11/1988 | Wieserman et al. |
| 5,145,816 A * | 9/1992 | Beck et al. .................. 502/60 |
| 5,512,256 A | 4/1996 | Bray et al. |
| 7,138,643 B2 | 11/2006 | Lewis et al. |
| 2003/0152502 A1 * | 8/2003 | Lewis et al. .................. 423/2 |
| 2004/0005272 A1 | 1/2004 | Sylvester et al. |
| 2004/0164025 A1 | 8/2004 | Lewis et al. |
| 2006/0018813 A1 | 1/2006 | Bray |

* cited by examiner

ADSORBENT, PREPARATION METHOD THEREOF AND SR-90/Y-90 GENERATOR USING THE SAME

CROSS-REFERENCE TO RELATED APPLICATIONS

This application is a 371 of PCT/KR2009/001574 filed Mar. 27, 2009, which claims the benefit of Korean Application No. 10-2008-0028514 filed Mar. 27, 2008, the contents of each of which are incorporated herein by reference.

TECHNICAL FIELD

The present invention relates to an adsorbent, a method of preparing the same, and a $^{90}Sr/^{90}Y$ generator using the same.

BACKGROUND ART $^{90}Y$ is a radioisotope for medical treatment and is being used clinically. As the use of $^{90}Y$ is getting increased, various types of generator systems have been developed over the last years.

However, currently, most of the registered patents are process patents such as solvent extraction processes by using metallic complexing agents, separation processes using commonly-used adsorbents, and the like.

Referring to the conventional technologies, Korean Patent Registration No. 3034 discloses an yttrium separation method, in which an aqueous mineral acid solution and a solution in which an yttrium-containing mixture dissolves in at least one of an organic acid solvent and an organic phosphate solvent flowing in the opposite direction are brought into contact with each other through a multistage liquid-liquid extraction system to extract a solute, and then the extracted solute returns to the first stage of the multistage liquid-liquid extraction system and thus the counterflow and contact procedure is further performed to recover an yttrium-containing solution, and then the recovered yttrium-containing solution is mixed with other solvents (among these solvents, at least one is different from the first solvent) to form mixed solutions, and then these mixed solutions flow in opposite directions and are thus brought into contact with each other through the multistage liquid-liquid extraction system to extract a solute, and then the extracted solute further returns to the first stage of the multistage liquid-liquid extraction system, thereby separating a pure yttrium-containing solution.

U.S. Patent Application Publication No. 2006-0018813 discloses a method for purifying $^{90}Y$ from $^{90}Sr$, comprising the steps of: (a) dissolving a radioactive strontium nitrate salt including $^{90}Sr$ nitrate and $^{90}Y$ nitrate in a water solution to form a mixed solution; (b) evaporating and then primarily drying the mixed solution to leave solids; (c) contacting the solids with more than 80 wt % of nitric acid ($HNO_3$), whereby $^{90}Y$ is dissolved in the acid solution and strontium is precipitated as a solid; and (d) separating the solids from the acid solution containing the $^{90}Y$, thereby purifying the $^{90}Y$.

However, the above solvent extraction processes are problematic in that a large amount of radioactive organic wastes is generated.

Therefore, recently, adsorption processes have been largely used to separate yttrium, And technologies of obtaining a final $^{90}Y$ solution having a ratio of $^{90}Sr/^{90}Y$ of about $10^{-5}$–$10^{-8}$ using a two, three, or more column stages have also been developed. In particular, since $^{90}Sr$ has a half-life period of 28.8 years and accumulates in bones when it is absorbed in a human body, it is a radioactive isotope whose content is strictly limited to 20 µCi per 1 Ci $^{90}Y$ solution.

U.S. Patent Application Publication No. 2004-0005272 discloses a method of separating $^{90}Y$ from $^{90}Sr$, comprising: adsorbing $^{90}Sr$ onto an inorganic ion exchange material from an aqueous solution including a source of $^{90}Sr$; and eluting $^{90}Y$ from the inorganic ion exchange material with a solution having a pH greater than about 5 and including a chelating agent.

U.S. Patent Application Publication No. 2004-0164025 discloses a method for separating metallic elements in aqueous solution using a hydrophobic chelating extractant, such as an organophosphorus compound, adsorbed onto carbon or graphite fibers in the form of felt, and discloses a $^{90}Y$ generator system including two extraction columns designed to selectively absorb $^{90}Y$ at different pHs.

However, when such an inorganic ion exchange material or a solvent extractant such as a hydrophobic chelating extractant is used, there is a problem in that organic matter gets decomposed by radiation and poisonous matter is released along with $^{90}Y$.

Therefore, the present inventors have made efforts to realize a system for producing a $^{90}Y$ solution through a simple process without generating poisonous matter that is harmful to a human body. As a result, it is found that since an adsorbent, prepared by introducing a bifunctional organosilane compound, such as a phosphonic group into silica which is the bone structure of the adsorbent, has a very low affinity to $^{90}Sr$ and a very high affinity to $^{90}Y$. By composing the adsorbent through the provided scheme here and the uses as a column material, high-purity $^{90}Y$ can be produced even when a one-stage adsorption column is used. Based on these findings, the present invention was completed.

DISCLOSURE OF INVENTION

Technical Problem

Accordingly, the present invention has been made keeping in mind the above problems occurring in the prior art, and an object of the present invention is to provide adsorbents for a $^{90}Y$ generator.

Another object of the present invention is to provide methods of preparing the adsorbents.

Still another object of the present invention is to provide a $^{90}Y$ generator using the adsorbents.

Still another object of the present invention is to provide a method of separating $^{90}Y$ from a solution including $^{90}Sr$ and $^{90}Y$ using the adsorbents.

Technical Solution

In order to accomplish the above object the present invention provides adsorbents for a $^{90}Y$ generator.

Further, the present invention provides methods of preparing the adsorbents.

Moreover, the present invention provides a $^{90}Y$ generator using the adsorbents.

Furthermore, the present invention provides a method of separating $^{90}Y$ from a solution including $^{90}Sr$ and $^{90}Y$ using the adsorbents.

Advantageous Effects

Since the radioisotope adsorbents according to the present invention has high adsorption capacity and selectivity for $^{90}Y$ of 95% or more, high-purity $^{90}Y$ can be extracted by using a one-stage adsorption column system, and thus it can be usefully used in the fields requiring $^{90}Y$.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Hereinafter, preferred embodiments of the present invention will be described in detail with reference to the attached drawings.

The present invention provides an adsorbent for a $^{90}Y$ generator.

The adsorbent of the present invention is prepared by introducing a bifunctional organosilane compound possessing an organosiloxane functional groups and a phosphate group into silica which is the bone structure of the adsorbent.

The most important factor in the development of an organic-inorganic composite material used to separate metal ($^{90}Y$) ions is to synthesize a functional ligand, which reacts with metal ions on the pore surface of the organic-inorganic composite material and thus separate the metal ions from a solution. In order to implant the ligand on the pore surface of the organic-inorganic composite material, the ligand must have reaction groups different from each other at both ends thereof. That is, the ligand must have a functional group having an element, such as N, O, S or P, which can react with metal ions, at one end thereof, and must have an organosiloxane functional groups, which can integrally composes silica matrix, which is a skeletal structure of the organic-inorganic composite material, at the other end thereof. Such a compound is referred to as a bifunctional organosilane compound. This compound is commercially available, but is not easy to be synthesized and refined, and thus is limitedly produced. For this reason, in the present invention, a bifunctional organosilane compound, which reacts with lanthanide elements or not easily reacts with alkaline metals at a given condition was prepared.

In the adsorbent of the present invention, the bifunctional organosilane compound including an organosiloxane functional group and a phosphate group may have a molecular structure represented by Chemical Formula 1 or 2 below.

[Chemical Formula 1]

(wherein R is a straight-chain or side chain alkyl group of $C_1$-$C_5$, M is a cation of $H^+$, $Na^+$, $K^+$ or the like, and n is an integer of 1~10.)

[Chemical Formula 2]

(wherein M is a cation of $H^+$, $Na^+$, $K^+$ or the like, and n is an integer of 1-10.)

The present inventors referred to an adsorbent in which the bifunctional organosilane compound represented by the above Chemical Formula 1 is bonded on the surface of silica as KRI-POS, and referred to an adsorbent in which the bifunctional organosilane compound represented by the above Chemical Formula 2 is bonded on the surface of silica as KRI-PSO.

In the adsorbent of the present invention, the KRI-POS or KRI-PSO has a predetermined ratio of P:Si. The ratio of P:Si may be 1:3-1:11, preferably 1:3-1:6.

In the adsorbent of the present invention, the adsorbent may have a particle size of 50-500 μm, but the present invention is not limited thereto. Even when the particle size of the adsorbent is less than 50 μm or more than 500 μm, the adsorption performance thereof is not problematic. However, when the particle size thereof deviates from the above range, the solution does not flow smoothly through an packed column or the adsorption and desorption of radioisotopes may be delayed.

In the adsorbent of the present invention, the KRI-POS or KRI-PSO can be prepared through a sol-gel process.

In an embodiment of the present invention, a method of preparing the KRI-POS may include the steps of: mixing tetraethoxysilane (TEOS) and hydrochloric acid, not limited to hydrochloric acid but other mineral acid, with an alcohol solution and then stirring the mixed solution to form a reaction mixture (step 1); adding 3-trihydroxylpropylmethyl-phosphonate (POS) to the reaction mixture formed in step 1 and then stirring them to form a gel (step 2); and aging, drying and crushing the gel formed in step 2 to prepare an adsorbent (step 3).

First, in step 1, tetraethoxysilane (TEOS) and hydrochloric acid are mixed with an alcohol solution and then stirred.

Here, the alcohol solution may be selected from among alkyl alcohol, allyl alcohol and mixtures thereof, and the hydrochloric acid may be diluted with a large amount of water and then used. Preferably, hydrochloric acid having a concentration of 0.1-0.15 M may be used in the present invention.

In this step, it is preferred that the molar ratio of ethanol:TEOS:water:HCl be 4:1:12-24:0.001-0.05.

Next, in step 2, 3-trihydroxylpropylmethyl-phosphonate (POS) is added to the reaction mixture formed in step 1 and then stirred to form a gel.

In this step, it is preferred that the 3-trihydroxylpropylmethyl-phosphonate (POS) be added to the reaction to have a ratio of TEOS:POS of 2-10:1.

Next, in step 3, the gel formed in step 2 is aged, dried and crushed to prepare an adsorbent.

Specifically, in this step, the gel formed in step 2 is left for about 24 hours to be aged, and then the aged gel is dried at 80° C. Subsequently, the dried gel is crushed by using a pestle and a mortar to obtain KRI-POS particles having a uniform particle size, preferably a particle size of 50-500 μm.

Thereafter, the obtained KRI-POS particles are washed with an organic solvent such as alcohol or acetone and then dried to obtain pure KRI-POS particles.

In another embodiment of the present invention, a method of preparing the KRI-PSO may include the steps of: mixing diethylphosphatoethyltriethoxysilane (PSA), tetraethoxysilane (TEOS) and hydrochloric acid (or other mineral acids) with an alcohol solution and then stirring the mixed solution to form a reaction mixture (step a); adding triethylamine (TEA) to the reaction mixture formed in step a and then stirring them to form a gel (step b); aging, drying and crushing the gel formed in step b to form KRI-PSA particles (step c); and removing alkyl groups from the KRI-PSA particles formed in step c to prepare an adsorbent (step d).

First, in step a, diethylphosphatoethyltriethoxysilane (PSA), tetraethoxysilane (TEOS) and hydrochloric acid are mixed with an alcohol solution and then stirred.

Here, the alcohol solution may be selected from among alkyl alcohol, allyl alcohol and mixtures thereof, and the hydrochloric acid may be diluted with a large amount of water and then used. Preferably, hydrochloric acid having a concentration of 0.1-0.15 M may be used in the present invention.

In this step, it is preferred that the molar ratio of ethanol:PSA:TEOS:water:HCl be 16:1:2-16:6-30:0.01-0.3.

Next, in step b, an organic base compound such as triethylamine (TEA) or an inorganic base solution such as ammonia is added to the reaction mixture formed in step a and then stirred to prepare a gel.

In this step, it is preferred that the triethylamine (TEA) is added to the reaction to have a ratio of PSA:TEA of 1:0.01-0.6.

Next, in step c, the gel formed in step b is aged, dried and crushed to form KRI-PSA particles.

Specifically, in this step, the gel formed in step b is left for about 24 hours to be aged, and then the aged gel is dried at 80° C. Subsequently, the dried gel is crushed by using a pestle and a mortar to obtain KRI-PSA particles having a uniform particle size, preferably a particle size of 50-500 μm.

Thereafter, the obtained KRI-PSA particles are washed with an organic solvent such as alcohol or acetone and then dried to obtain pure KRI-PSA particles.

Next, in step d, alkyl groups are removed from the KRI-PSA particles formed in step c to prepare an adsorbent.

In this step, the KRI-PSA particles formed in step c are put into concentrated hydrochloric acid, heated for several hours to several tens of hours under reflux, filtered and then washed with distilled water. Thereafter, the resulting product is washed with alcohol, acetone or the like, and then dried to prepare KRI-PSO.

Further, the present invention provides a $^{90}Sr/^{90}Y$ generator including an adsorption column filled with the adsorbent.

Sine the adsorbent of the present invention has more excellent adsorption ability than conventional adsorbents (refer to Table 1), it can be beneficially employed as an column packing material in a radioisotope generator extracting $^{90}Y$.

Figure 1:
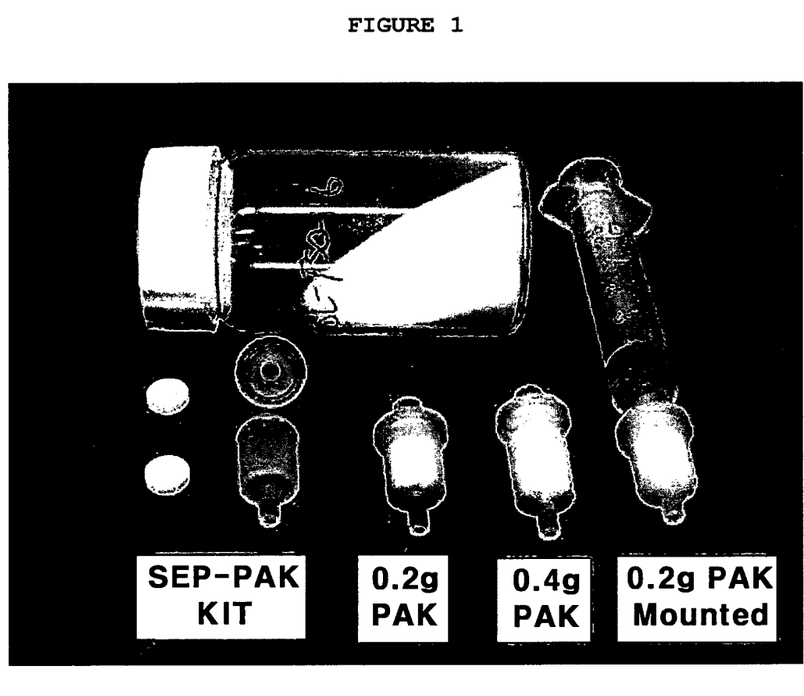
FIG. 1 is a photograph showing an adsorption column according to an embodiment of the present invention.

In the $^{90}Sr/^{90}Y$ generator of the present invention, a SEP-PAK® type plastic column shown in FIG. 1 can be used as the adsorption column. The SEP-PAK® type plastic column is a kind of package type column including a plastic main body filled with an adsorbent, a lower filter provided in the lower end of the plastic main body, an upper filter provided in the upper end of the plastic main body and a cap covering the top of the plastic main body. Further, since the SEP-PAK® type plastic column is small, it can be very usefully to employ in separation of radioisotopes even when it is used and then discarded.

Furthermore, the present invention provides a method of separating $^{90}Y$ from a $^{90}Sr/^{90}Y$ solution, including the steps of: passing a 0.1-0.5N nitric acid containing $^{90}Sr$ and $^{90}Y$ through an adsorption column filled with the adsorbent of the present invention to adsorb $^{90}Y$ (step A); passing a 0.1-0.5N nitric acid solution through the adsorption column to wash out $^{90}Sr$ from the adsorption column (step B); and passing a 2-5N nitric acid solution through the adsorption column to elute $^{90}Y$ (step C).

Since the adsorbent of the present invention has a high selectivity toward $^{90}Y$ a high loading capability toward $^{90}Y$ up to 95% or more, high-purity $^{90}Y$ can be produced by using only a one-stage adsorption column.

Figure 4:
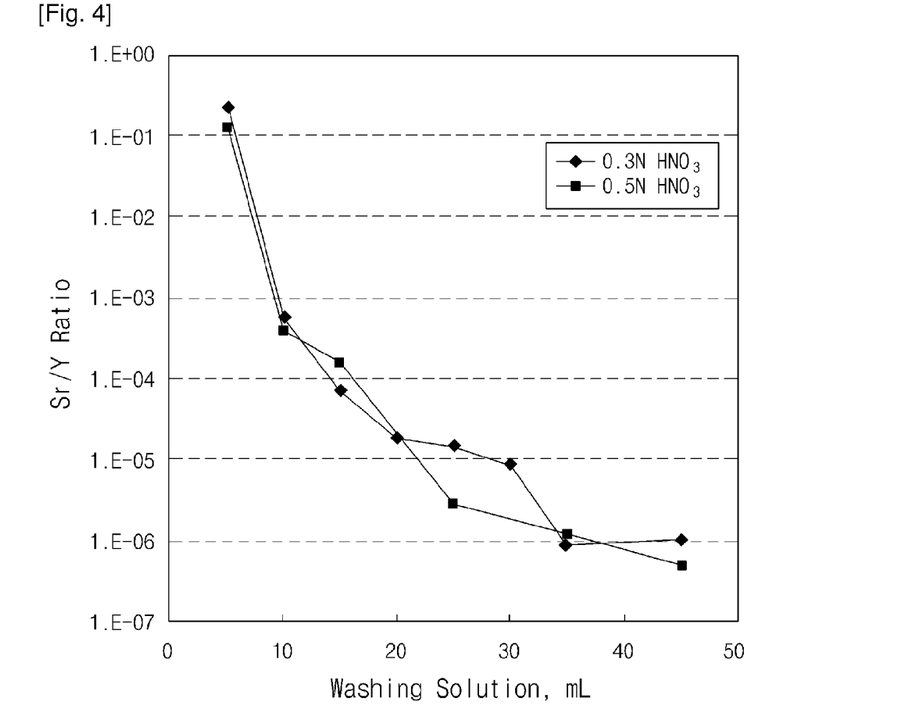
FIG. 4 is a graph showing strontium/yttrium ratios depending on the amount of a washing solution according to an embodiment of the present invention.
Figure 5:
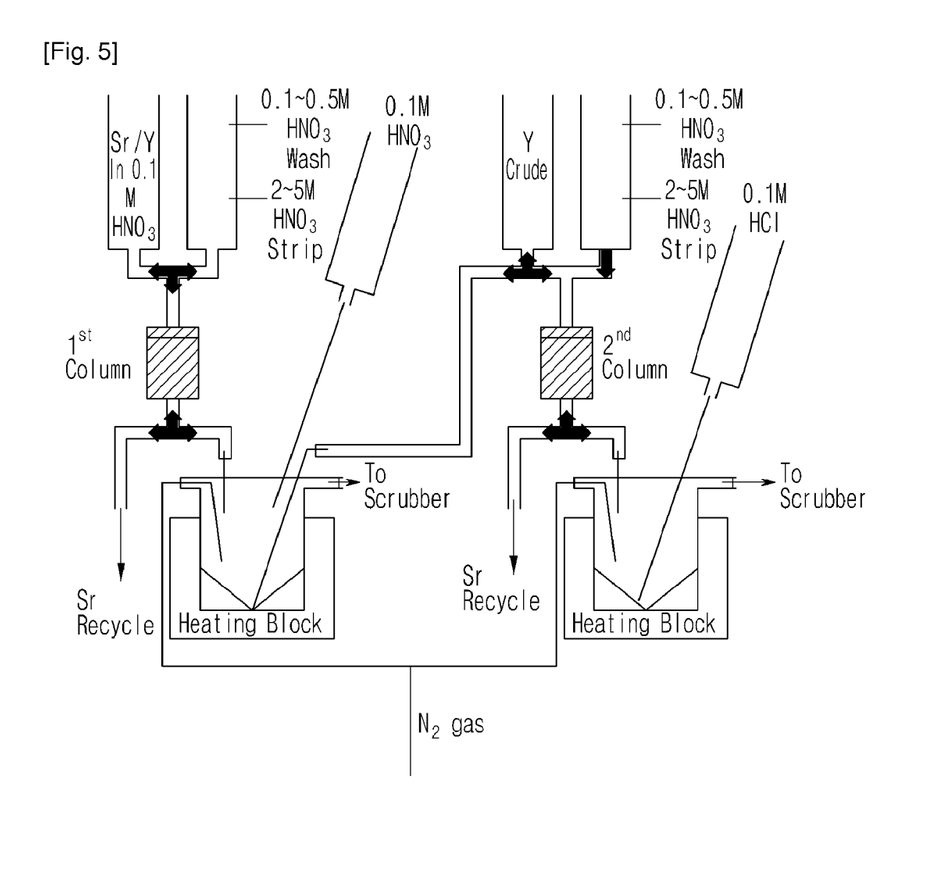
FIG. 5 is a schematic view showing a two-stage column system using different kinds of adsorbents according to an embodiment of the present invention.

However, in order to produce higher-purity $^{90}Y$, as shown in FIG. 4, the $^{90}Y$ solution separated in step C moves to an adsorption column filled with a different adsorbent to further perform the separation process. In this case, examples of the different adsorbent may include the adsorbent of the present invention and adsorbents commonly used in the related fields, but are not limited thereto. For example, when an adsorption column filled with KRI-PSO is used as a first adsorption column, an adsorption column filled with KRI-POS or an adsorption column filled with KRI-CMPO represented by Chemical Formula 3 below can be used as a second adsorption column.

[Chemical Formula 3]

Figure 6:
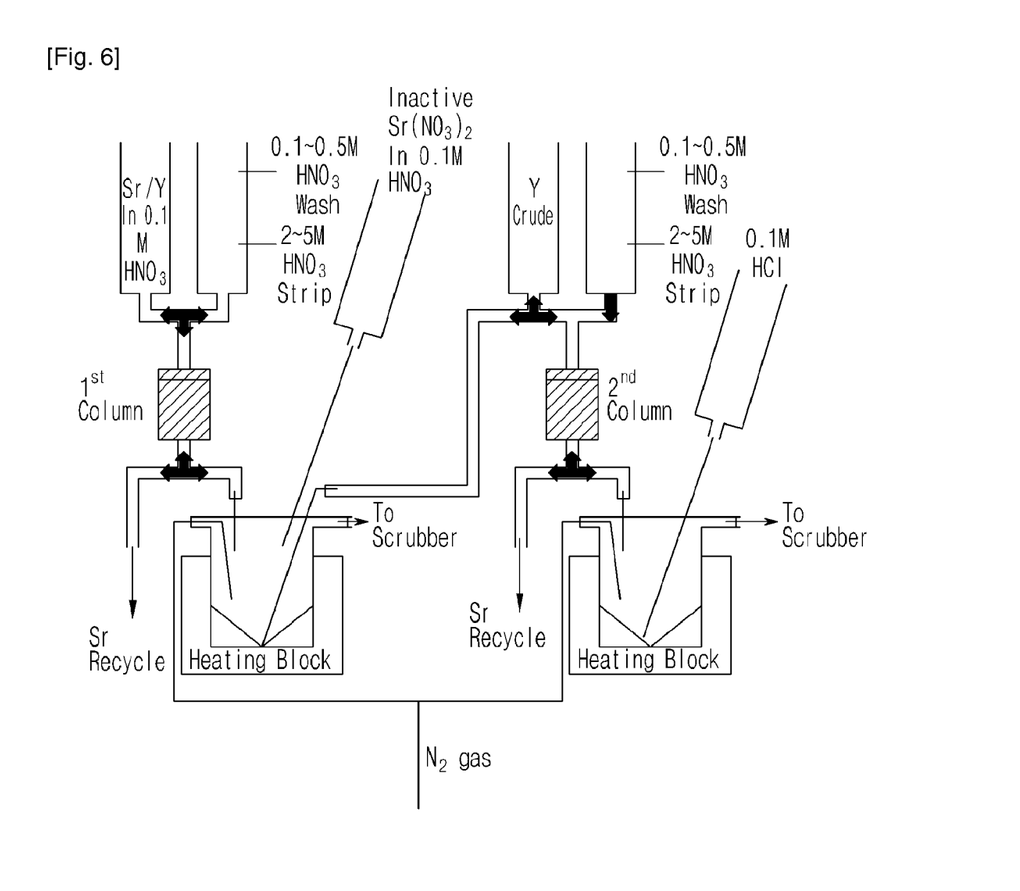
FIG. 6 is a schematic view showing a two-stage column system using the same kinds of adsorbents according to an embodiment of the present invention.
Figure 7:
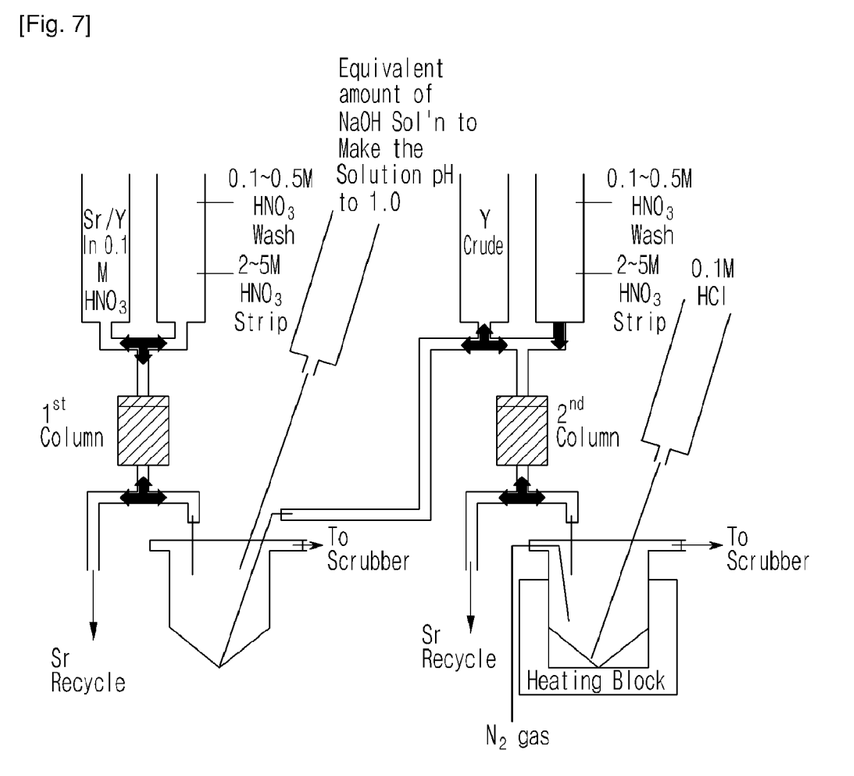
FIG. 7 is a schematic view showing a two-stage column system using the same kinds of adsorbents according to an embodiment of the present invention.

Further, when an adsorption column filled with the same kind of adsorbent is used, as shown in FIG. 6, the $^{90}Y$ solution separated in step C is heated to volatilize nitric acid and thus remove the nitric acid therefrom, and then an certain amount of $Sr(NO_3)_2$ solution is added to the $^{90}Y$ solution and then moves to the adsorption column filled with the same kind of adsorbent to further perform the separation process, or, as shown in FIG. 7, a basic salt such as sodium hydroxide (NaOH) is added to the $^{90}Y$ solution separated in step C to adjust the concentration of nitric acid in the $^{90}Y$ solution in a range of 0.1-0.5N and then moves to the adsorption column filled with the same kind of adsorbent to further perform the separation process.

MODE FOR THE INVENTION

Hereinafter, the present invention will be described in more detail with reference to the following Examples. The following Examples are set forth to illustrate the present invention, and the scope of the present invention is not limited thereto.

Example 1

Synthesis of KRI-POS(P:Si=1:6)

52.8 mmol (11.76 mL) of tetraethoxysilane (TEOS) was dissolved in 211 mmol (12.4 mL) of ethanol to form a mixed solution, and then 11.4 mL of hydrochloric acid (0.14 mol/L) was added to the mixed solution and simultaneously stirred to form a reaction mixture. After 30 minutes, 10.56 mmol (4.8 mL, 42% in water) of 3-trihydroxylpropylmethyl-phosphonate (POS) was slowly added to the reaction mixture and then stirred to form a gel. Subsequently, the gel was left at room temperature for 24 hours and then dried at 80° C. Subsequently, the dried gel was crushed by using a pestle and a mortar to collect particles having a particle size of 50-500 μm by sieving. Thereafter, the separated particles were sequentially washed with water, ethanol and acetone and then dried to produce a targeted KRI-POS adsorbent.

Example 2

Synthesis of KRI-POS(P:Si=1:4)

A targeted KRI-POS adsorbent was prepared using the same method as in Example, except that 52.8 mmol (11.76 mL) of tetraethoxysilane (TEOS) and 11.4 mL of hydrochloric acid (0.14 mol/L) were added to 211 mmol (12.4 mL) of ethanol.

Example 3

Synthesis of KRI-PSO(P:Si=1:5)

39.6 mmol (14.4 mL) of diethylphosphatoethyltriethoxysilane (PSA) and 158.4 mmol (35.4 mL) of tetraethoxysilane (TEOS) were mixed with 633.6 mmol (37.2 mL) of ethanol to form a mixed solution, and then 633.6 mmol (11.4 mL) of hydrochloric acid (0.14M) was added to the mixed solution and then stirred and reacted for 1 hour to form a reaction mixture. Subsequently, 5.7 mmol (1.2 mL) triethylamine (TEA) was added to the reaction mixture and then stirred to form a gel. Subsequently, the gel was left at room temperature for 24 hours and then dried at 80° C. Subsequently, the dried gel was crushed by using a pestle and a mortar to collect particles having a particle size of 50-500 μm by sieving. Thereafter, the separated particles were sequentially washed with water, ethanol and acetone and then dried to prepare KRI-PSA.

The prepared KRI-PSA was added to concentrated hydrochloric acid, heated and recycled for 15 hours, then cooled and filtered to recover reacted solid materials. Thereafter, the separated materials was sequentially washed with water, ethanol and acetone and then dried at 80° C. to produce a KRI-PSO adsorbent.

Example 4

Preparation of $^{90}$Y Generator Column

A small-sized SEP-PAK® type plastic column was used as an adsorption column.

The SEP-PAK® type plastic column includes a plastic main body filled with the KRI-POS adsorbent prepared in Example 1, a lower filter provided in the lower end of the plastic main body, an upper filter provided in the upper end of the plastic main body and a cap covering the top of the plastic main body. As shown in FIG. 1, an $^{90}$Y generator column was prepared by mounting a syringe in the cap of the adsorption column.

Example 5

Preparation of $^{90}$Y Generator Column

As shown in FIG. 1, an $^{90}$Y generator column was manufactured using the same method as in Example 4, except that the plastic main body of the adsorption column was filled with the KRI-PSO adsorbent prepared in Example 3 instead of the KRI-POS adsorbent prepared in Example 1.

Experimental Example 1

$^{90}$Sr/$^{90}$Y Adsorption Performance Test

The adsorption performance of the adsorbent of the present invention to $^{90}$Sr and $^{90}$Y according to the change of pH was tested as follows.

Specifically, a KRI-POS adsorbent prepared in Example 1 or a KRI-PSO adsorbent prepared in Example 3 was added to a solution including $^{90}$Sr and $^{90}$Y in a pH of 2-10 and then stirred for a predetermined time, and simultaneously the adsorption capacities thereof were measured by using a gamma spectrometer (MCA).

Figure 2:
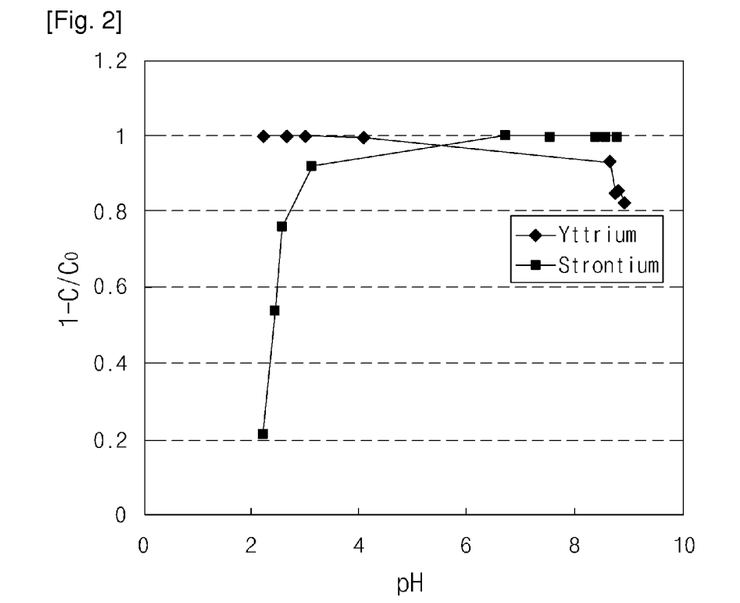
FIG. 2 is a graph showing the adsorbing selectivity to yttrium and strontium depending on pH according to an embodiment of the present invention.

The measured results thereof are shown in FIG. 2.

As shown in FIG. 2, it can be seen that $^{90}$Y was adsorbed to approximately 100% in a pH of 2-4, whereas $^{90}$Sr exhibited approximately 100% adsorption in a pH of 6 or more but the adsorption capacity thereof is rapidly decreased in a pH of 3 or less. For this reason, in a $^{90}$Sr/$^{90}$Y generator system using the adsorbent of the present invention, the concentration of nitric acid was adjusted to have a pH of 2 or less, so that the adsorption of $^{90}$Sr was minimized and the adsorption of $^{90}$Y was maintained.

Therefore, since the adsorbent of the present invention can adsorb only yttrium while not adsorbing strontium by properly adjusting the pH, it can be usefully employed in an $^{90}$Y generator.

Experimental Example 2

$^{90}$Sr/$^{90}$Y Adsorption Process

In order to examine the preferred conditions of an adsorption process using a column in a $^{90}$Sr/$^{90}$Y generator system using the adsorbent of the present invention, the following test was conducted.

In order to determine the adsorption and separation conditions of $^{90}$Sr/$^{90}$Y in a column, a very small amount of $^{90}$Sr/$^{90}$Y was added as a tracer to 25 mL of a solution (nitric acid concentration: 0.1N, 0.2N, 0.3N or 0.5N) obtained by simulating a 1Ci $^{90}$Sr/$^{90}$Y solution (a solution containing chemically equivalent amounts of strontium and yttrium to 1Ci $^{90}$Sr and 1Ci $^{90}$Y in the decay equilibrium), and then the simulated solution was introduced into a SEP-PAK® type column filled with 0.4 g of the adsorbent (KRI-POS or KRI-PSO) prepared in Example 4 or 5 at a flow rate of 1 mL/min by using a syringe. Thereafter, the radioactivity of the $^{90}$Sr/$^{90}$Y solution introduced into the SEP-PAK® type column and the activities of $^{90}$Sr and $^{90}$Y in the solution having passed through the SEP-PAK® type column were measured, and thus the adsorbed amounts of $^{90}$Sr and $^{90}$Y were analyzed.

Figure 3:
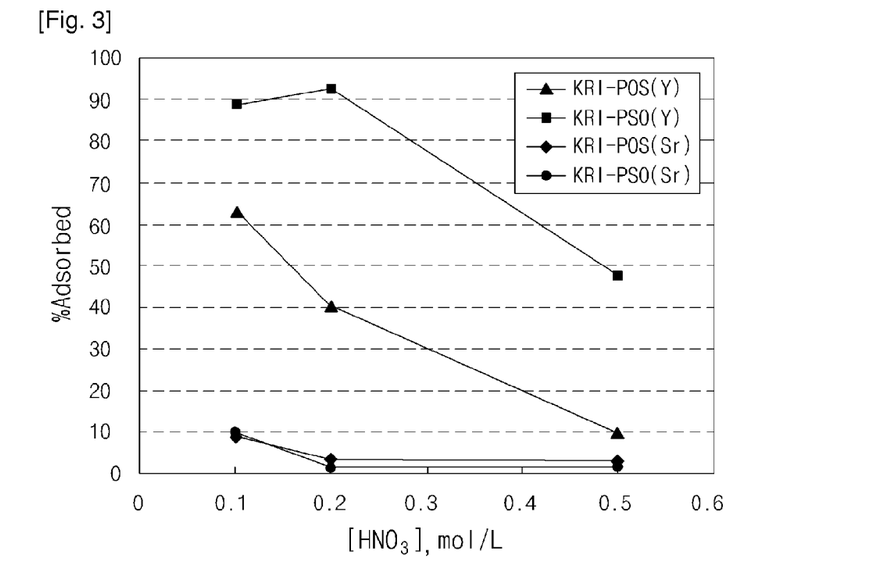
FIG. 3 is a graph showing the adsorbing selectivity to yttrium and the strontium depending on nitric acid concentrations to an embodiment of the present invention.

The measured results thereof are shown in FIG. 3.

As shown in FIG. 3, it can be seen that in the case of the KRI-PSO adsorbent, the adsorption capacity of yttrium was about 90% in a nitric acid solution having a concentration of 0.1-0.2N, but in the case of the KRI-POS adsorbent, the adsorption capacity of yttrium was about 65% in a nitric acid solution having a concentration of 0.1N and was decreased in a nitric acid solution having a concentration of higher than 0.1N. Therefore, it is preferred to use a 0.1N nitric acid solution in an adsorption process.

Experimental Example 3

$^{90}$Sr/$^{90}$Y Adsorption/Desorption Process

In order to examine the preferred conditions of a desorption process using a column in a $^{90}$Sr/$^{90}$Y generator system using the adsorbent of the present invention, the following test was conducted.

A very small amount of $^{90}$Sr/$^{90}$Y was added as a tracer to 25 mL of a solution (nitric acid concentration: 0.1N, 0.2N or 0.5N) obtained by simulating a 1Ci $^{90}$Sr/$^{90}$Y solution (a solution containing chemically equivalent amounts of strontium and yttrium to 1Ci $^{90}$Sr and 1Ci $^{90}$Y in the decay equilibrium), and then the $^{90}$Sr/$^{90}$Y solution was introduced into a SEP-PAK® type column filled with 0.2 g of the adsorbent (KRI-POS or KRI-PSO) prepared in Example 4 or 5 at a flow rate of 1 mL/min using a syringe. Thereafter, the radioactivity of the $^{90}$Sr/$^{90}$Y solution introduced into the SEP-PAK® type column and the activities of $^{90}$Sr and $^{90}$Y in the solution having passed through the SEP-PAK® type column were measured, and thus the adsorbed amounts of $^{90}$Sr and $^{90}$Y were analyzed.

After passing the adsorption solution through the column, in order to wash out the $^{90}$Sr/$^{90}$Y un-reacted in the column and the adsorbed $^{90}$Sr, a nitric acid solution of 0.1-0.5N passed through the column 2-3 times. The elution (desorption) of $^{90}$Y was conducted using 10 mL of a 3N nitric acid solution, and the results of the adsorbed and eluted amounts of $^{90}$Y and $^{90}$Sr are shown in Table 1.

adsorbent according to the present invention have excellent adsorption efficiency and extraction efficiency, it can be usefully used as an adsorbent for a $^{90}$Sr/$^{90}$Y generator system.

Experimental Example 4

Production of $^{90}$Y Solution Having a $^{90}$Sr/$^{90}$Y Ratio of Less than $10^{-5}$ One of the important factors of a $^{90}$Sr/$^{90}$Y generator system is the amount of $^{90}$Sr remained in the eluted $^{90}$Y solution.

Since $^{90}$Sr has a half-life period of 28.8 years and accumulates in bones when it is absorbed in a human body, its content is strictly limited to 20 μCi per 1 Ci $^{90}$Y solution. Really, a $^{90}$Y solution having a ratio of $^{90}$Sr/$^{90}$Y≦20 μCi/Ci is commercially sold at a radiochemical grade, and, particularly, a $^{90}$Y solution having a ratio of $^{90}$Sr/$^{90}$Y≦20 μCi/Ci until its expiration date, which is sterilized in order to be used in hospitals, is sold for medical treatments.

Therefore, in order to extract a $^{90}$Y solution having a ratio of $^{90}$Sr/$^{90}$Y≦20 μCi/Ci, experiments to minimize the ratio of $^{90}$Sr/$^{90}$Y in $^{90}$Y solutions were conducted by using various methods.

(1) Addition of Excess Non-Radioactive Strontium 0.4 g of a KRI-PSO adsorbent was packed in a SEP-PAK® type column, and then 25 mL of an 1Ci simulated solution of $^{90}$Sr by using strontium nitrate and a trace amount of $^{85}$Sr at 0.1N nitric acid concentration was fed to the KRI-PSO column. Subsequently, the absorption column was washed by using 15 mL of 0.3N nitric acid and then eluted by using 15 mL of 3.0N nitric acid. On the other hand, the same experiment but 4 times strontium nitrate was used for adsorption was conducted to compare the amount of strontium existing in the eluted solution.

TABLE 1

| Adsorbent | Nitric acid washing (N/mL) | Adsorbed (%) Sr | Adsorbed (%) Y | Washed (%) Sr | Washed (%) Y | Eluted (%) Sr | Eluted (%) Y | Sr/Y eluted solution |
|---|---|---|---|---|---|---|---|---|
| KRI-POS | 0.1/15 | 1.1 | 99.6 | 2.0 | ~0 | 0.02 | 62*¹ | 2.0 × 10⁻⁴ |
| KRI-PSO | 0.1/15 | 11.3 | 99.3 | 11.3 | ~0 | 0.1 | ~100 | 9.1 × 10⁻⁴ |
|  | 0.2/15 | 12.3 | 97.3 | 13.6 | 0.17 | 8 × 10⁻³ | 95.0 | 8.6 × 10⁻⁴ |
|  | 0.3/15 | 14.6 | 99.0 | 14.7 | 0.15 | 0.025 | 98.1 | 2.5 × 10⁻⁴ |
|  | 0.5/15 | 13.8 | 99.6 | 13.9 | 7.0 | 2 × 10⁻³ | 89.8 | 2.2 × 10⁻⁴ |

*Adsorbed % = ($N_{initial} - N_{adsorbed}$)/$N_{initial}$ × 100 * Washed % = ($N_{washed}$)/$N_{initial}$ × 100 * Eluted % = ($N_{extracted}$)/$N_{initial}$ × 100 (extracted using 3N nitric acid) * Sr/Y = activity ration in eluted solution
*¹increased by 10% by the elution with additionally added 5 mL of 5N nitric acid As shown in Table 1, it can be seen that since both the KRI-POS and KRI-PSO adsorbents mostly adsorb yttrium in a 0.1N nitric acid solution, the adsorption performance thereof is very excellent. In terms of elution efficiency, in the case of the KRI-POS adsorbent, the elution efficiency of yttrium was 62% when a 3 N nitric acid solution was used, and the elution efficiency thereof was increased by about 10% even when a 5 N nitric acid solution was additionally used, and thus the total extraction efficiency was 72%. Further, in the case of the KRI-PSO adsorbent, both the adsorption efficiency and extraction efficiency of yttrium were 95% or more. Therefore, since the KRI-POS adsorbent and KRI-PSO The measured results thereof are shown in Table 2.

TABLE 2

|  | Amount of $^{85}$Sr in the eluted solution |
|---|---|
| Loading of 1 Ci simulated solution | 2.27 × 10⁻⁵ |
| Loading of 1 Ci simulated solution containing 4 times of additional strontium nitrate | 6.41 × 10⁻⁶ |

As shown in Table 2, it can be seen that, when 1 Ci simulated solution is loaded and then consequently eluted, the amount of $^{85}$Sr in the eluted solution by 3.0N nitric acid with respect to the amount in the loading solution is $2.27 \times 10^{-5}$, whereas, when 4 times of additional non-radioactive strontium is added to the loading solution, the amount thereof is $6.41 \times 10^{-6}$, which is decreased by about 1/3.5 of the amount thereof when 1 Ci simulated solution is loaded.

Therefore, it can also be seen that the ratio of $^{90}$Sr/$^{90}$Y in the $^{90}$Y solution can be decreased by adding excess amount of nonradioactive strontium to a loading solution.

(2) Amounts of Washing Solutions

The recovery yield of $^{90}$Y and the Sr/Y ratio were measured while increasing the amount of a washing solution by a 5 mL increment in a range of 5-45 mL to decide an adequate washing condition. In this case, both $^{85}$Sr and $^{90}$Sr/$^{90}$Y were used as tracers, and the washing solutions having washed the column were analyzed by using a gamma spectrometer and a liquid scintillation counter.

The analyzed results thereof are shown in FIG. 4.

As shown in FIG. 4, it can be seen that the Sr/Y ratio in the washing solution is decreased according to the amounts of 0.3N and 0.5N nitric acid solutions. However, it is noticed from the experiments, in terms of the loss of yttrium by washing, every 0.36% of the amount of yttrium with respect to the amount originally fed into the column was eluted out by every 5 mL of 0.3N nitric acid washing solution, whereas, every 0.61% of the amount of yttrium is eluted out from the column by 5 mL of 0.5N nitric acid solution.

Therefore, when 45 mL of the washing solution is used, the overall loss of $^{90}$Y including the loss from the adsorption step is 16% and 28% by 0.3N and 0.5N nitric acid solutions, respectively.

After the washing, $^{90}$Y was extracted from the column using 10 mL of 3 N nitric acid, and, as a result, it can be seen that in the case of the 0.3N nitric acid washing solution, total 81% of yttrium originally in the feed solution to the adsorption column was recovered, whereas, in the case of the 0.5N nitric acid washing solution, 70% of yttrium was recovered. Therefore, it can be seen that most of the $^{90}$Y remaining in the column after the washing was recovered by the elution with the 3.0N nitric acid. Further, in the case of the 0.3N nitric acid washing solution, the Sr/Y ratio in the yttrium solution was about $8 \times 10^{-7}$, and in the case of the 0.5N nitric acid washing solution, the Sr/Y ratio in the yttrium solution was about $5 \times 10^{-7}$. Therefore, a yttrium solution having a $^{90}$Sr/$^{90}$Y ratio of 20 μCi/Ci or less can be produced with a radio-chemical grade.

Experimental Example 5

$^{90}$Sr/$^{90}$Y Separation by a 2-Stage Columns

In a $^{90}$Sr/$^{90}$Y generator system using the adsorbent of the present invention, in order to examine the recovery ratio and purity of yttrium when a 2-stage adsorption columns filled with the same adsorbent is used, the following tests were conducted.

<5-1> Measurement of Yttrium Recovery Ratio 0.4 g of a KRI-PSO adsorbent was packed in the first SEP-PAK® type column and then 25 mL of an 1Ci simulated solution of $^{90}$Sr by using strontium nitrate and a trace amount of $^{90}$Sr/$^{90}$Y at 0.1N nitric acid concentration was fed to the column to load $^{90}$Y on the adsorbent. Followed by the loading step, 10 mL of 0.2N nitric acid and 10 mL of 0.3N nitric acid sequentially passed through the first adsorption column to wash the column. Subsequently, 10 mL of 3 N nitric acid passed through the column to elute $^{90}$Y and $^{90}$Sr remaining in the first column. Then, 0.2 mL of the eluted solution from the first column was taken for the measurement of radioactivities of $^{90}$Sr and $^{90}$Y using a liquid scintillation counter (LSC), and 9 mL from the eluted solution was reconditioned such that the nitric acid solution has a concentration of 0.1N by adding 23.64 mL of a 1 N NaOH solution thereto.

Subsequently, 0.1 mL of 0.1N nitric acid including 7.5 mg of non-radioactive strontium as strontium nitrate was added to the reconditioned solution to make a feed solution for a second column. Then, 0.2 mL of the solution was used to measure its radioactivity, and the feed solution for the second column was passed through the second column packed with 0.4 g of the KRI-PSO adsorbent. Then, the radioactivity of the effluent solution from the column was measured. Thereafter, 10 mL of 0.2N nitric acid and 10 mL of 0.3N nitric acid sequentially passed through the second column to wash. Subsequently, 10 mL of 3 N nitric acid passed through the second column to elute yttrium loaded on the second column. One-fifth mL of the eluted solution having passed through the second column was used to measure the radioactivity of $^{90}$Sr and $^{90}$Y by using a liquid scintillation counter (LSC).

As a result, the yttrium eluted from the first column by using 3 N nitric acid was recovered to 100% of the initial amount thereof, and then 96% of yttrium of fed to the second column was recovered from the elution of the second column by the 3 N nitric acid.

From the above result, it can be seen that after the separation of yttrium, the recovery ratio of yttrium is 96% or more even when the 2-stage adsorption column is used.

<5-2> Measurement of Yttrium Purity

The purity of yttrium was examined by evaluating the radioactivity of $^{90}$Sr remaining in the eluted $^{90}$Y solution. In order to evaluated the radioactivity of $^{90}$Sr remaining in the $^{90}$Y solution, the following tests were conducted using $^{85}$Sr as a tracer instead of using $^{90}$Sr/$^{90}$Y as the tracer. Unlike $^{90}$Sr which emits only pure β-rays, since the $^{85}$Sr emits γ-rays and an infinitesimal amount thereof can be analyzed by using a multichannel pulse height analyzer (MCA), it is used as the tracer in the analysis of $^{90}$Sr/$^{90}$Y adsorption/desorption behaviors.

0.4 g of a KRI-PSO adsorbent was packed in a primary adsorption column, and then 25 mL of a 0.1N nitric acid solution containing 300 mg/L of non-radioactive strontium and $^{85}$Sr of 20 μCi passed through the first adsorption column of the KRI-PSO adsorbent. Subsequently, 10 mL of 0.2N nitric acid and 10 mL of 0.3N nitric acid sequentially passed through the first adsorption column to wash. Then, the radioactivities of the washed solutions were analyzed by using a multichannel pulse height analyzer (MCA). Subsequently, 10 mL of 3 N nitric acid was passed through the column to desorb the strontium remaining in the first adsorption column. Then, the nitric acid solution was reconditioned such that the solution has a concentration of 0.1N nitric acid by adding 26.37 mL of a 1 N NaOH solution thereto, and then the radioactivity of the solution was measured by using a multichannel pulse height analyzer (MCA).

Subsequently, 0.1 mL of 0.1N nitric acid containing 7.5 mg of non-radioactive strontium was added to the reconditioned solution for the second column. Then, 0.2 mL of the feed solution for the second column was used to measure its radioactivity, and the remaining feed solution was passed through the second column packed with 0.4 g of the KRI-PSO adsorbent. Then, 10 mL of 0.2N nitric acid and 10 mL of 0.3N nitric acid sequentially passed through the column to wash. Subsequently, 10 mL of 3 N nitric acid passed through the second column to elute the strontium remaining in the second column. Then, the radioactivity of the eluted solution was measured by using the multichannel pulse height analyzer (MCA).

The adsorption capacity, washing efficiency, recovery ratio, and total recovery ratios of the first and the second adsorption columns were calculated by the following calculation method from the measured radioactivities of the solutions.

Adsorption capacity=radioactivity of a feed solution after passing through a column/radioactivity of solution before passing through the column Washing efficiency=radioactivity of washing solution after passing through the loaded column/radioactivity of the loaded column itself Recovery ratio=radioactivity of eluted solution for each column/radioactivity of the feed solution to each column for loading Total recovery ratio=radioactivity of the eluted solution for the second column/radioactivity of the original feed solution to the first column.

The calculated results thereof are shown in Table 3.

TABLE 3

| Column | Adsorption capacity for Sr | Washing efficiency for Sr | Recovery ratio for Sr | Total recovery ratio for Sr |
|---|---|---|---|---|
| 1st column | 0.2 | 0.97 | $1.9 \times 10^{-6}$ Ð | Ð |
| 2nd column | 0.02 | 0.83 | $2.7 \times 10^{-5}$ Ð | $5.1 \times 10^{-11}$ Ð |

As shown in Table 3, it can be seen that, when the aqueous strontium solution was passed through the 1st column, reconditioned by a NaOH solution, added an excess amount of non-radioactive strontium to the reconditioned solution, and then passed through the second column, the ratio of the amount of the finally eluted and recovered yttrium to the amount of strontium originally fed into the first column is less than $10^{-10}$.

Therefore, when $^{90}Y$ is separated by using the above method, 95% of $^{90}Y$ can be separated and recovered with a $^{90}Sr/^{90}Y$ ratio of $10^{-10}$ or less.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is;

1. A radioisotope adsorbent comprising:
   a compound represented by Chemical Formula 1 or 2 bonded on the surface of silica which is a bone structure of the adsorbent:

[Chemical Formula 1]

[Chemical Formula 2]

wherein
R is a straight-chain or side chain alkyl group of $C_1$-$C_5$;
M is a cation of $H^+$, $Na^+$ or $K^+$; and
n is an integer of 1-10.

2. The radioisotope adsorbent according to claim 1, wherein the adsorbent has a ratio of P:Si of 1:3-1:11.

3. The radioisotope adsorbent according to claim 1, wherein the adsorbent has a particle size of 50-500µm.

4. A method of preparing the radioisotope adsorbent of claim 1, comprising the steps of:
   mixing tetraethoxysilane (TEOS) and 0.14M hydrochloric acid with ethanol to form a mixed solution and then stirring the mixed solution to form a reaction mixture (step 1);
   adding 3-trihydroxylpropylmethyl-phosphonate (POS) to the reaction mixture and then stirring the reaction mixture to form a gel (step 2); and
   aging, drying and crushing the gel to prepare the adsorbent of claim 1 (step 3),
   wherein the adsorbent comprises the compound represented by Chemical Formula 1 bonded on the surface of silica which is a bone structure of the adsorbent.

5. A method of preparing the radioisotope adsorbent of claim 1, comprising the steps of:
   mixing diethyl phosphatoethyl triethoxysilane (PSA), tetraethoxysilane (TEOS) and hydrochloric acid with an alcohol solution to form a mixed solution and then stirring and reacting the mixed solution to form a reaction mixture (step a);
   adding triethylamine (TEA) to the reaction mixture and then stirring the reaction mixture to form a gel (step b);
   aging, drying and crushing the gel to form particles (step c); and
   removing alkyl groups from the particles to prepare the adsorbent of claim 1 (step d),
   wherein, the adsorbent comprises the compound represented by Chemical Formula 2 bonded on the surface of silica which is a bone structure of the adsorbent.

6. A $^{90}Sr/^{90}Y$ generator comprising an adsorption column filled with the radioisotope adsorbent of claim 1.

7. The $^{90}Sr/^{90}Y$ generator according to claim 6, wherein the adsorption column is a package column comprising a plastic main body filled with absorbent, a lower filter provided in the lower end of the plastic main body, an upper filter provided in the upper end of the plastic main body, and a cap covering the top of the plastic main body.

8. A method of separating $^{90}Y$ from a $^{90}Sr/^{90}Y$ solution, comprising the steps of:
   passing a $^{90}Sr/^{90}Y$ solution including 0.1-0.5N nitric acid through a first adsorption column filled with the adsorbent of claim 1 to adsorb $^{90}Y$ (step A);
   passing a 0.1-0.5N nitric acid solution through the adsorption column to remove the un-reacted $^{90}Sr/^{90}Y$ solution and $^{90}Sr$ adsorbed in the adsorption column (step B); and
   passing a 2-5N nitric acid solution through the adsorption column to elute $^{90}Y$ (step C).

9. The method according to claim 8, further comprising the step of:

moving the $^{90}Y$ solution separated in step C to an adsorption column packed with a different adsorbent from the first adsorption column to further perform the separation process in order to produce high-purity $^{90}Y$.

10. The method according to claim 8, further comprising steps of:

heating the $^{90}Y$ solution separated in step C to volatilize nitric acid and thus remove the nitric acid therefrom (step D); and then adding a certain amount of $Sr(NO_3)_2$ solution to the $^{90}Y$ solution and then feeding the solution containing $Sr(NO_3)_2$ and $^{90}Y$ to an additional adsorption column packed with the same adsorbent as in the first column to perform the separation process in order to produce high-purity $^{90}Y$ step E).

11. The method according to claim 8, further comprising steps the step of:

partially neutralizing nitric acid ($HNO_3$) in the $^{90}Y$ solution separated in step C using a sodium hydroxide (NaOH) solution to adjust the concentration of nitric acid in the $^{90}Y$ solution in a range of 0.1-0.5N (step F); and then feeding the $^{90}Y$ solution obtained from step F to an additional adsorption column packed with the same adsorbent as in the first column to perform the separation process in order to produce high-purity $^{90}Y$ (step G).

* * * * *